United States Patent
Yoshida et al.

(10) Patent No.: US 11,592,800 B2
(45) Date of Patent: Feb. 28, 2023

(54) ABNORMALITY DETECTOR OF A MANUFACTURING MACHINE USING MACHINE LEARNING

(71) Applicant: FANUC Corporation, Yamanashi (JP)

(72) Inventors: Hirosato Yoshida, Yamanashi (JP); Nobuyuki Ootake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 960 days.

(21) Appl. No.: 16/411,143

(22) Filed: May 14, 2019

(65) Prior Publication Data

US 2019/0354080 A1 Nov. 21, 2019

(30) Foreign Application Priority Data

May 21, 2018 (JP) .............................. JP2018-097018

(51) Int. Cl.

| G05B 19/4063 | (2006.01) |
| G05B 13/02 | (2006.01) |
| G06N 20/00 | (2019.01) |
| B23Q 17/00 | (2006.01) |
| B23Q 17/09 | (2006.01) |

(52) U.S. Cl.
CPC ......... *G05B 19/4063* (2013.01); *B23Q 17/00* (2013.01); *B23Q 17/0952* (2013.01); *B23Q 17/0957* (2013.01); *G05B 13/0265* (2013.01); *G06N 20/00* (2019.01); *G05B 2219/33034* (2013.01); *G05B 2219/34475* (2013.01)

(58) Field of Classification Search
CPC ..... G06N 20/00; B23Q 17/00; G05B 2219/33

USPC .......................................................... 706/12
See application file for complete search history.

(56) References Cited

U.S. PATENT DOCUMENTS

| 7,353,214 B2* | 4/2008 | Yamanishi ............. G06N 5/025 |
| | | 706/14 |
| 2005/0182591 A1 | 8/2005 | Taniguchi et al. |
| 2010/0207762 A1* | 8/2010 | Lee ........................ G06V 20/52 |
| | | 340/541 |

(Continued)

FOREIGN PATENT DOCUMENTS

| JP | H7-28502 A | 1/1995 |
| JP | 2005-233720 A | 9/2005 |

(Continued)

*Primary Examiner* — Md Azad
(74) *Attorney, Agent, or Firm* — Hauptman Ham, LLP

(57) ABSTRACT

An abnormality detector includes a signal output unit for detecting a sign of an abnormality based on a physical quantity acquired from a manufacturing machine and outputting a signal; and a machine learning device including state observation unit for observing, as a state variable representing a present state of the environment, physical quantity data indicating the physical quantity related to an operation of the manufacturing machine from the manufacturing machine; a label data acquisition unit for acquiring, as label data, operation state data indicating an operation state of the manufacturing machine; a learning unit for learning the operation state of the manufacturing machine with respect to the physical quantity, using the state variable and the label data; and an estimation result output unit for estimating the operation state of the manufacturing machine using a learning result by the learning unit and outputting an estimation result.

5 Claims, 4 Drawing Sheets

(56) References Cited

U.S. PATENT DOCUMENTS

| | | | | |
|---|---|---|---|---|
| 2012/0185418 A1* | 7/2012 | Capman | ................. | G06N 20/00 706/12 |
| 2017/0293862 A1* | 10/2017 | Kamiya | ............. | G01N 29/4481 |
| 2017/0330775 A1* | 11/2017 | Shiraishi | ................ | G06Q 10/06 |
| 2018/0264613 A1* | 9/2018 | Tamai | .................. | G06N 3/0454 |
| 2019/0210176 A1* | 7/2019 | Yamamoto | ......... | G05B 19/4065 |

FOREIGN PATENT DOCUMENTS

| | | |
|---|---|---|
| JP | 2008-76414 A | 4/2008 |
| JP | 201824055 A | 2/2018 |
| WO | 2011125130 A1 | 10/2011 |

\* cited by examiner

ABNORMALITY DETECTOR OF A MANUFACTURING MACHINE USING MACHINE LEARNING

RELATED APPLICATIONS

The present application claims priority to Japanese Patent Application Number 2018-097018 filed May 21, 2018, the disclosure of which is hereby incorporated by reference herein in its entirety.

BACKGROUND OF THE INVENTION

1. Field of the Invention

The present disclosure relates to an abnormality detector for detecting a sign of an abnormality of a manufacturing machine.

2. Description of the Related Art

There is known a detector that generates a signal (alarm) indicating an abnormality for stopping an operation of an apparatus before a manufacturing machine such as a robot or a machine tool breaks down. Before generating a signal (alarm) indicating the abnormality, such a detector detects a sign of an abnormality based on a physical quantity detected by the manufacturing machine, or detected around the manufacturing machine, or a change in the physical quantity. Upon detecting a sign of the abnormality, the detector generates a warning. Conditions for generating a warning are, for example, that a fluctuation amount of the detected physical quantity exceeds a predetermined quantity, that the sign of the detected physical quantity is reversed, and that there is deviation of the detected physical quantity from a predetermined value. In the related art, the conditions for generating such a warning have been uniformly set when a manufacturing machine is manufactured (for example, see JP 2005-233720 A and JP 2008-076414 A).

It is also known that machine learning is used when the condition for detecting a specific abnormality is not easy to be set (for example, see JP 07-028502 A). In machine learning, coupling weight coefficients between layers of the neural network are learned, by using the physical quantity or a change amount in the physical quantity detected at the time of an abnormality as teacher data.

In general, the manufacturing machine is affected by a usage environment such as an area where the manufacturing machines are installed, a power supply circumstance, a factory, and season. Also, there are various types of manufacturing machines, and the machine axes provided with the manufacturing machines are also different. Also, the number of years in use also differs in each manufacturing machine. Due to differences in such a usage environment and the like, physical quantities detected by each manufacturing machine or detected around each manufacturing machine, and change amounts of the physical quantities are different from one another. Also, determination values obtained as a result of statistical processing on the physical quantities are also different in respective manufacturing machines. That is, the signs detected at the time of an abnormality are also different among the manufacturing machines. Therefore, as in the related art, in a case where the conditions for generating a warning are uniformly specified at the time of manufacture, it is not always possible to accurately predict an abnormality.

Also, in a case where a controller learns coupling weight coefficients using the physical quantity detected at the time of abnormality or a change amount in the physical quantity as teacher data, the controller incorrectly learns a continuously detected physical quantity, a change amount in the physical quantity, or a determination value obtained as a result of the statistical processing on the physical quantity, as a sign of an abnormality. In this case, there is a problem that the controller incorrectly assigns weighting to a coupling weight coefficient and the erroneous detection of the abnormality is performed based on an incorrect learning model.

In this regard, an object of the present disclosure is to provide an abnormality detector capable of detecting a sign of an abnormality of a manufacturing machine which changes depending on the operating environment or the manufacturing machine.

SUMMARY OF THE INVENTION

The abnormality detector according to an embodiment of the present disclosure learns a sign of an abnormality after the abnormality detector is shipped. Therefore, for each an abnormality detector, a condition that is determined to be a sign of an abnormality is specified depending on the usage environment. As a result, the abnormality detector of the present disclosure is capable of predicting an abnormality accurately depending on the usage environment. An abnormality detector according to an embodiment of the present disclosure proceeds learning with positive and negative rewards to be assigned, using both a physical quantity detected by the manufacturing machine or detected around the manufacturing machine at the time of an abnormality and, thereafter, a physical quantity detected by the manufacturing machine or detected around the manufacturing machine when it becomes a normal state, as teacher data. In this way, a waveform detected by the manufacturing machine or detected around the manufacturing machine is classified into any one of three waveforms of a waveform of a physical quantity that is a sign of abnormality, a waveform of a physical quantity indicating stability, and a waveform of a physical quantity unrelated to an abnormality. In this way, the abnormality detector is capable of accurately recognizing the sign of the abnormality.

Then, according to one embodiment of the present disclosure, there is provided an abnormality detector for outputting a signal indicating that a sign of an abnormality in a manufacturing machine has been detected, including: a signal output unit for outputting a signal, in a case where a sign of an abnormality in a manufacturing machine has been detected by detecting a sign of abnormality of the manufacturing machine based on a physical quantity acquired from the manufacturing machine, a sensor installed in the manufacturing machine, or a sensor installed in the vicinity of the manufacturing machine; and a machine learning device for learning an operation state of the manufacturing machine, in which the machine learning device includes a state observation unit for observing, as a state variable representing a present state of an environment, physical quantity data indicating a physical quantity related to an operation of the manufacturing machine from the manufacturing machine, a sensor installed in the manufacturing machine, or a sensor installed in the vicinity of the manufacturing machine, a label data acquisition unit for acquiring, as label data, operation state data indicating an operation state of the manufacturing machine, a learning unit for learning the operation state of the manufacturing machine with respect to the physical quantity related to the operation of the manufacturing machine, using the state variable and the label data, and an estimation result output unit for estimating the operation state of the manufacturing machine using a learning result by the learning unit, based on the physical quantity related to the operation of the manufacturing machine observed by the state observation unit, and outputting an estimation result; and when a sign of an abnormality in a manufacturing machine has been detected, the signal output unit suspends output of the signal, according to an estimation result of the operation state of the manufacturing machine output by the estimation result output unit.

According to the present disclosure, it is possible to detect a sign of an abnormality of a manufacturing machine which changes depending on the operating environment of the manufacturing machine.

BRIEF DESCRIPTION OF THE DRAWINGS

The above and other objects and features of the present disclosure will be apparent from the following description of embodiments with reference to the accompanying drawings. Of those figures.

DETAILED DESCRIPTION OF THE PREFERRED EMBODIMENTS

Hereinafter, embodiments of the present disclosure will be described with reference to the drawings.

Figure 1:
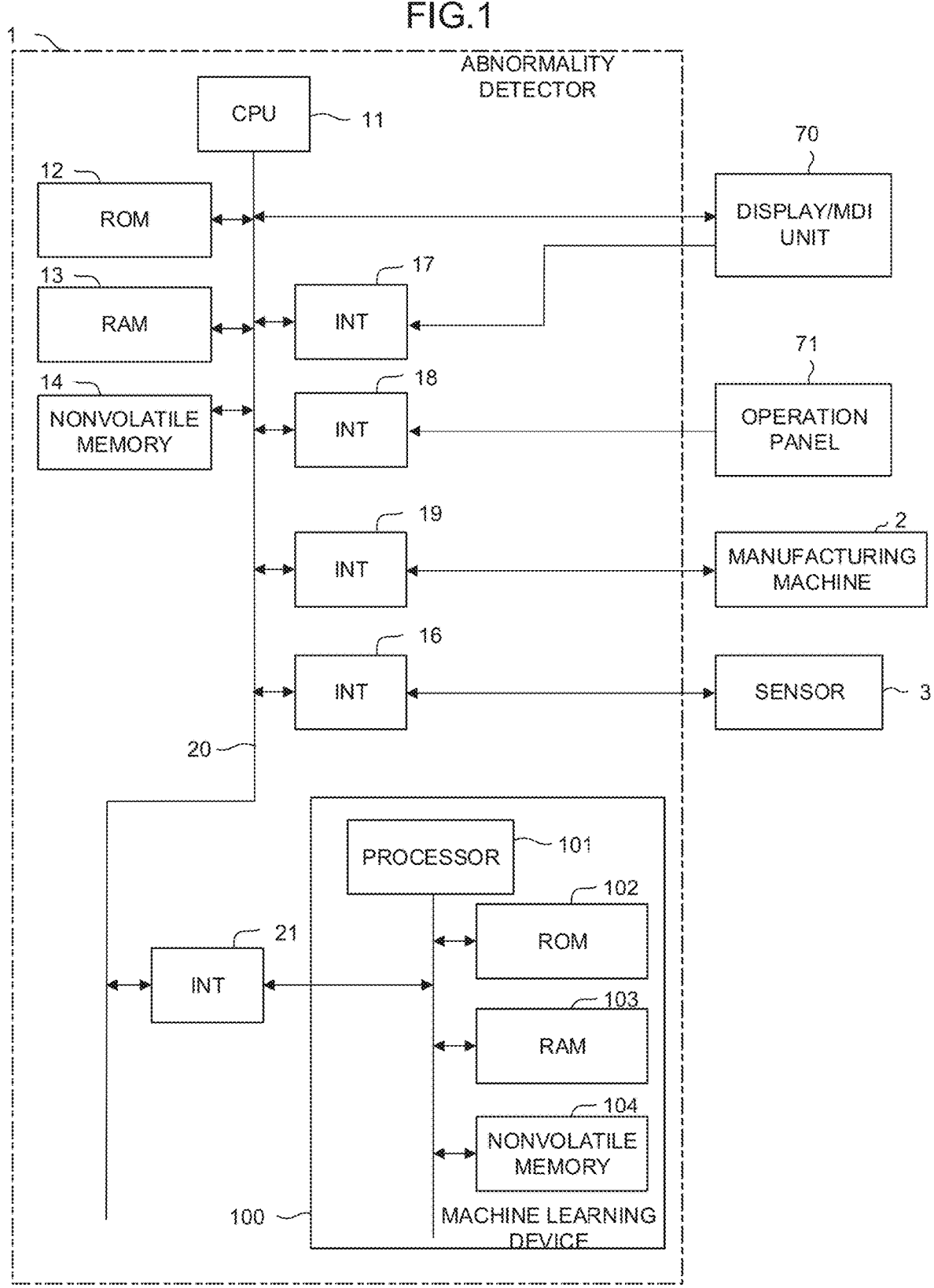
FIG. 1 is a schematic hardware configuration diagram of an abnormality detector according to a first embodiment.

FIG. 1 is a schematic hardware configuration diagram illustrating a main part of an abnormality detector according to the first embodiment. An abnormality detector 1 is mounted on, for example, a controller that controls a manufacturing machine such as a robot or a machine tool. Also, the abnormality detector 1 may be mounted on, for example, a personal computer provided on the side of a controller that controls a manufacturing machine, or a computer such as a cell computer, a host computer, an edge server, a cloud server, and the like connected to the controller through a wired/wireless network. In the present embodiment, there is illustrated an example in a case where the abnormality detector 1 is mounted on a controller that controls the manufacturing machine 2.

A central processing unit (CPU) 11 included in the abnormality detector 1 according to the present embodiment is a processor that controls the abnormality detector 1 as a whole. The CPU 11 reads, through a bus 20, a system program stored in a read only memory (ROM) 12, and controls the entire abnormality detector 1 according to the system program. Temporary calculation data and display data, and various data input by an operator through an input unit (not illustrated) are temporarily stored in a RAM 13.

A nonvolatile memory 14 is backed up by, for example, a battery (not illustrated). Therefore, the nonvolatile memory 14 maintains a storage state even when the abnormality detector 1 is powered off. The nonvolatile memory 14 stores a program read from the outside, a program input through a display/manual data input (MDI) unit 70, various data (for example, a voltage/current of a motor acquired from manufacturing machine 2, a displacement of a position of an axis included in the manufacturing machine 2, a velocity, acceleration, a temperature, humidity, an electromagnetic field, sound, quantity of light, and the like detected by the manufacturing machine 2 or a sensor 3 installed around manufacturing machine 2) acquired from each unit of the an abnormality detector 1 or the manufacturing machine 2. The program and various data stored in the nonvolatile memory 14 may be loaded in the RAM 13 in execution or in use. Also, various system programs such as a known analysis program (including a system program for controlling transmission and reception of information performed between the machine learning device 100 to be described later and each unit) are written in the ROM 12 in advance.

The display/MDI unit 70 is a manual data input apparatus including a display, a keyboard and the like. An interface 17 receives commands, data, and the like from the keyboard of the display/MDI unit 70 and sends the commands, data, and the like to the CPU 11. An interface 18 is connected to an operation panel 71 including a manual pulse generator and the like used when manually driving each axis.

An interface 21 is an interface for connecting each unit of the abnormality detector 1 and the machine learning device 100. The machine learning device 100 includes a processor 101 that controls the entire machine learning device 100, and a ROM 102 that stores system programs and the like. Also, the machine learning device 100 includes a RAM 103 for storing data and the like temporarily used in each processing related to machine learning, and a nonvolatile memory 104 used for storing a learning model and the like. The machine learning device 100 is able to observe each piece of information (for example, the voltage/current of the motor acquired from the manufacturing machine 2 through the interface 19, a displacement of a position of an axis included in the manufacturing machine 2, a velocity, acceleration, a temperature, humidity, an electromagnetic field, sound, quantity of light, and the like acquired from the manufacturing machine 2 or a sensor 3 installed around manufacturing machine 2 through the interface 16) acquirable by each unit of the abnormality detector 1 through the interface 21. Also, the abnormality detector 1 performs control of detecting a sign of an abnormality using an estimation result of an operation state of the manufacturing machine 2 derived in the machine learning device 100.

Figure 2:
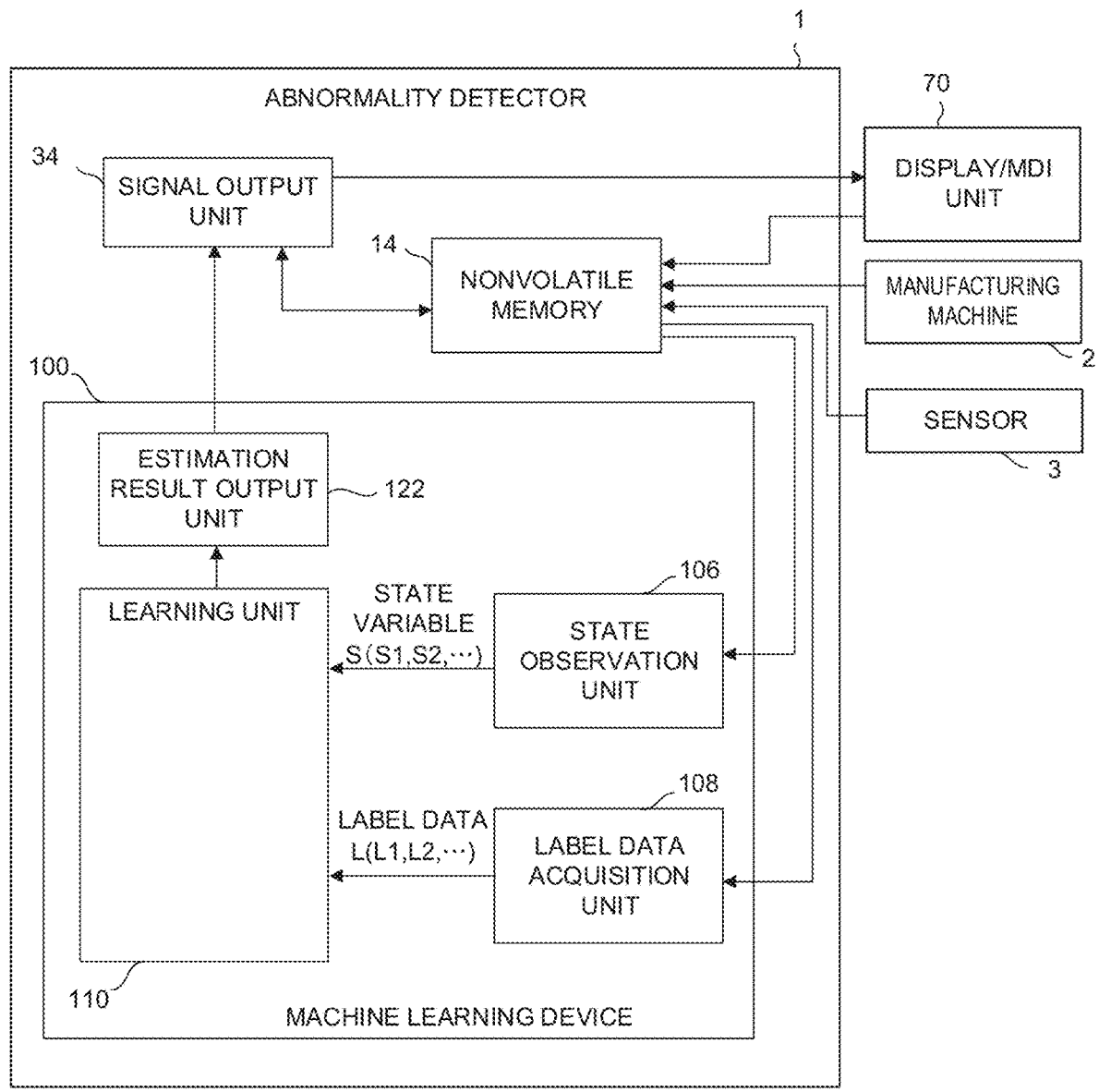
FIG. 2 is a schematic functional block diagram of the abnormality detector according to the first embodiment.

FIG. 2 is a schematic functional block diagram of the abnormality detector 1 including the machine learning device 100 according to the first embodiment. The CPU 11 included in the abnormality detector 1 illustrated in FIG. 1 and the processor 101 of the machine learning device 100 execute each system program to control the operation of each unit of the abnormality detector 1 and the machine learning device 100, thereby executing each function of functional blocks illustrated in FIG. 2.

The abnormality detector 1 according to the present embodiment determines whether or not a sign of an abnormality has occurred in the manufacturing machine 2, and includes a signal output unit 34 for outputting a signal indicating detection of a sign of an abnormality, in a case where it is determined that the sign of an abnormality has occurred in the manufacturing machine 2. The signal output unit 34 determines that a sign of an abnormality has occurred in the manufacturing machine 2, in a case where a physical quantity acquired from the manufacturing machine 2, a change in the physical quantity, or a determination value obtained as a result of statistical processing on the physical quantity exceeds a predetermined threshold. The physical quantity obtained from the manufacturing machine 2 is, for example, the voltage/current of the motor, the displacement of the position of the axis included in the manufacturing machine 2, the velocity, and the acceleration. Also, the signal output unit 34 determines that a sign of an abnormality has occurred in the manufacturing machine 2, in a case where a physical quantity detected by the manufacturing machine 2 or the sensor 3 installed around the manufacturing machine 2, a change in the physical quantity, or a determination value obtained as a result of statistical processing on the physical quantity exceeds a predetermined threshold. The physical quantity detected by the manufacturing machine or the sensor 3 installed around the manufacturing machine is, for example, the temperature, humidity, the electromagnetic field, sound, quantity of light, and the like of the manufacturing machine 2 or around the manufacturing machine. The signal output unit 34 may determine that a sign of an abnormality has occurred for one physical quantity detected from the manufacturing machine 2 or the sensor 3. Also, the signal output unit 34 may determine that the sign of an abnormality has occurred complexly based on a plurality of physical quantities. The signal indicating detection of a sign of an abnormality output by the signal output unit 34 is used for, for example, a warning display on the display/MDT unit 70, an alert signal to the manufacturing machine 2 and peripheral apparatus of the manufacturing machine 2, and an alert signal to a cell computer, a host computer, and the like connected through a network (not illustrated).

As described above, the signal output unit 34 outputs a signal indicating detection of a sign of an abnormality, in a case where a physical quantity basically acquired from the manufacturing machine 2 or the sensor 3, a change in the physical quantity, or a determination value obtained as a result of statistical processing on the physical quantity exceeds a predetermined threshold. However, in a case where, even though the physical quantity, the change in the physical quantity, or the determination value obtained as a result of statistical processing on the physical quantity exceeds the predetermined threshold, the estimation result that the manufacturing machine 2 is within a specified operation range is output from the machine learning device 100, the signal output unit 34 suspends the signal indicating detection of the sign of an abnormality. Incidentally, in a case where the machine learning device 100 is outputting a probability that the manufacturing machine 2 is operating within the specified operation range, as the estimation result, the machine learning device 100 may suspend a signal indicating detection of a sign of an abnormality according to the probability (for example, in cases where she output probability exceeds a predetermined threshold, or where determination is performed according to an amount of deviation from a predetermined threshold of a physical quantity indicating a sign of an abnormality, a change in the physical quantity or a determination value obtained as a result of statistical processing on the physical quantity, and a probability that the manufacturing machine 2 is operating within the specified operation range, and the like).

The machine learning device 100 included in the abnormality detector 1 includes software (such as a learning algorithm) and hardware (such as the processor 101) for performing learning for estimating what kind of operation state of the manufacturing machine 2 is with respect to the physical quantity detected by the manufacturing machine or detected around the manufacturing machine by the machine learning. The machine learning device 100 included in the abnormality detector 1 generates a model structure representing correlation between the physical quantity detected by the manufacturing machine 2 or detected around the manufacturing machine 2, and the operation state of the manufacturing machine 2 in the case of the physical quantity being detected.

As illustrated by functional blocks in FIG. 2, the machine learning device 100 included in the abnormality detector 1 includes a state observation unit 106, a label data acquisition unit 108, and a learning unit 110. The state observation unit 106 observes physical quantity data S1 indicating the physical quantity acquired from the manufacturing machine 2 or the sensor 3 disposed around the manufacturing machine 2, as a state variable S indicating a present state of an environment. The label data acquisition unit 108 acquires label data L including operation state data L1 indicating the operation state of the manufacturing machine 2. By using the state variable S and the label data L, the learning unit 110 learns a correlation between the physical quantity detected by the manufacturing machine 2 or detected around the manufacturing machine 2, and the operation state of the manufacturing machine 2 in the case of the physical quantity being detected.

Among the state variables S observed by the state observation unit 106, the physical quantity data S1 is time-series data of physical quantities acquired from the manufacturing machine 2 or the sensor 3. The time-series data of physical quantities acquired from the manufacturing machine 2 or the sensor 3 is data in which physical quantities acquired from the manufacturing machine 2 or the sensor 3 for each predetermined cycle are arranged in order. For example, the state observation unit 106 may acquire physical quantities for a predetermined cycle as time-series data from a memory such as a nonvolatile memory 14 that temporarily stores physical quantities obtained from the manufacturing machine 2 or the sensor 3. The physical quantity acquired as the physical quantity data S1 is, for example, the voltage/current of the motor acquired from the manufacturing machine 2, the displacement of the position, a velocity, acceleration of the axis included in the manufacturing machine 2, and a temperature, humidity, an electromagnetic field, sound, quantity of light, and the like detected by the manufacturing machine 2 or a sensor 3 installed around manufacturing machine 2. The learning unit 110 may use time-series data of one of these physical quantities as a state variable targeted for learning and estimation. Also, the learning unit 110 may use a set of time-series data of a plurality of physical quantities among these physical quantities as a state variable targeted for learning and estimation.

At the time of learning, for example, the label data acquisition unit 108 acquires, as operation state data L1, information related to the operation situation of the manufacturing machine 2 input from the display/MDT unit 70 by an operator. When the signal output unit 34 outputs a signal indicating detection of a sign of an abnormality of the manufacturing machine 2, the information related to the operation situation of the manufacturing machine 2 is, for example, information (information indicating whether or not there is an abnormality in the manufacturing machine 2) input after the operation of the manufacturing machine 2 is interrupted automatically or by an operation of the operator, and a state of the manufacturing machine 2 is confirmed by the operator or maintenance personnel. Also, information related to the operation situation of the manufacturing machine 2 is, for example, information (information indicating that there is an abnormality in the manufacturing machine 2) input after any an abnormality occurs in the manufacturing machine 2 and the operation of the manufacturing machine 2 is interrupted, and the state or the manufacturing machine 2 is confirmed by the operator or maintenance personnel. Incidentally, the label data acquisition unit 108 is used at the time of learning by the learning unit 110, and need not be an integral component of the machine learning device 100 after the learning by the learning unit 110 is completed.

The learning unit 110 learns label data L (operation state data L1 indicating the operation state of the manufacturing machine 2) for the state variable S (physical quantity data S1 indicating a physical quantity acquired from the manufacturing machine 2 or the sensor 3) according to an optional learning algorithm collectively called machine learning. That is, the learning unit 110 learns the correlation between the state variable S and the label data L. The learning unit 110 learns, for example, the correlation between the physical quantity date. S1 included in the state variable S and the operation state data L1 included in the label data L. The learning unit 110 iteratively executes the learning based on a data set including the state variable S and the label data L.

When the label data acquisition unit 108 acquires the operation state data L1 as the label data L, the learning unit 110 performs machine learning using the physical quantity data S1 that has been observed as the state variable S immediately before that acquisition. The label data acquisition unit 108 acquires the operation state data L1 when, for example, the operator or maintenance personnel inputs the operation state of the manufacturing machine 2. The learning unit 110 executes machine learning in at least the following two cases. (1) The learning unit 110 executes machine learning, in a case where the signal output unit 34 detects a sign of an abnormality of the manufacturing machine 2 and there is actually an abnormality in the manufacturing machine 2. (2) The learning unit 110 executes machine learning, in a case where the signal output unit 34 detects a sign of an abnormality in the manufacturing machine 2 but there is no abnormality in the manufacturing machine 2. The learning unit 110 extracts a characteristic portion from the time-series data of the physical quantity that has been observed as the state variable S immediately before acquiring the operation state data L1, and sets the characteristic portion as the physical quantity data S1. The learning unit 110 executes machine learning using the physical quantity data S1 and the operation state data L1. The characteristic portion is, for example, one, or two or more of a fluctuation amount or amplitude of a waveform indicating the physical quantity, a fluctuation time, the number of fluctuations, a frequency, and an amount of deviation from a specified value for outputting a signal indicating the abnormality. The characteristic portion is, for example, (a) a portion where the fluctuation amount exceeds a predetermined size, (b) a portion where the amount of deviation from a specified value for outputting a signal indicating the abnormality has become a predetermined ratio, (c) a portion where the amount of deviation from a specified value for outputting a signal indicating the abnormality has become a predetermined ratio and a predetermined time has elapsed, (d) a portion indicating that an amplitude larger than a predetermined amplitude has occurred more than a predetermined number of times within a predetermined time, (e) a portion indicating that a frequency higher than a predetermined frequency has occurred for a predetermined time, (f) a portion indicating that an inclination of the waveform within a predetermined time or a change in the inclination is larger than a predetermined numerical value, or (g) a portion where these have occurred complexly.

Also, (3) the learning unit 110 may execute machine learning in a case where the signal output unit 34 detects no sign of an abnormality in the manufacturing machine 2, but nevertheless, there is an abnormality in the manufacturing machine 2. Also, the learning unit 110 may execute machine learning, in a case where (4) the signal output unit 34 detects no sign of an abnormality in the manufacturing machine 2, and there is no abnormality in the manufacturing machine 2. Also in these cases, the learning unit 110 executes machine learning using the physical quantity data S1 that has been observed as the state variable S immediately before executing the machine learning and the operation state data L1. For the (4), for example, in a case where, in the history of physical quantities acquired from the manufacturing machine 2 or the sensor 3 stored in the nonvolatile memory 14, no abnormality is confirmed in the manufacturing machine 2, and there is a waveform similar to the waveform of the time-series data of physical quantities acquired immediately before it is confirmed that there is an abnormality in the manufacturing machine 2, a waveform of that portion may be observed as physical quantity data S1 and used for machine learning. The learning in the (4) is useful for causing the learning unit 110 to learn that the waveform indicating time-series data of physical quantities does not necessarily indicate the sign of an abnormality. By repeating such learning, the learning unit 110 is able to generate a model for estimating correctness/incorrectness of the detection result of the sign of an abnormality of the manufacturing machine 2 output by the signal output unit 34, in the environment where the manufacturing machine 2 is installed.

By repeating such a learning cycle, the learning unit 110 automatically interprets the correlation between the physical quantity (physical quantity data S1) acquired from the manufacturing machine 2 or the sensor 3, and the operation state (operation state data L1) of the manufacturing machine 2. At the start of the learning algorithm, the correlation between the physical quantity data S1 and the operation state data L1 is substantially unknown. The learning unit 110 gradually interprets the correlation between the physical quantity data S1 and the operation state data L1 in proceeding with the learning. The learned model obtained as a result of interpreting the correlation between the physical quantity data S1 and the operation state data L1 is used to estimate the operation state data L1 for the physical quantity data S1.

The estimation result output unit 122 estimates the operation state of the manufacturing machine 2 based on the physical quantity acquired from the manufacturing machine 2 or the sensor 3 using the result (learned model) learned by the learning unit 110, and outputs an estimated operation state of the manufacturing machine 2. The estimation result output unit 122 outputs an operation state of the manufacturing machine 2 estimated as the machine learning device 100 when at least the signal output unit 34 detects a sign of an abnormality of the manufacturing machine 2. That is, the estimation result output unit 122 outputs an estimation result of the correctness/incorrectness of the detection result of the sign of an abnormality of the manufacturing machine 2 by the signal output unit 34. The estimation result output unit 122 may output, for example, a probability that the manufacturing machine 2 is operating normally, using a learning result by the learning unit 110.

Figure 3:
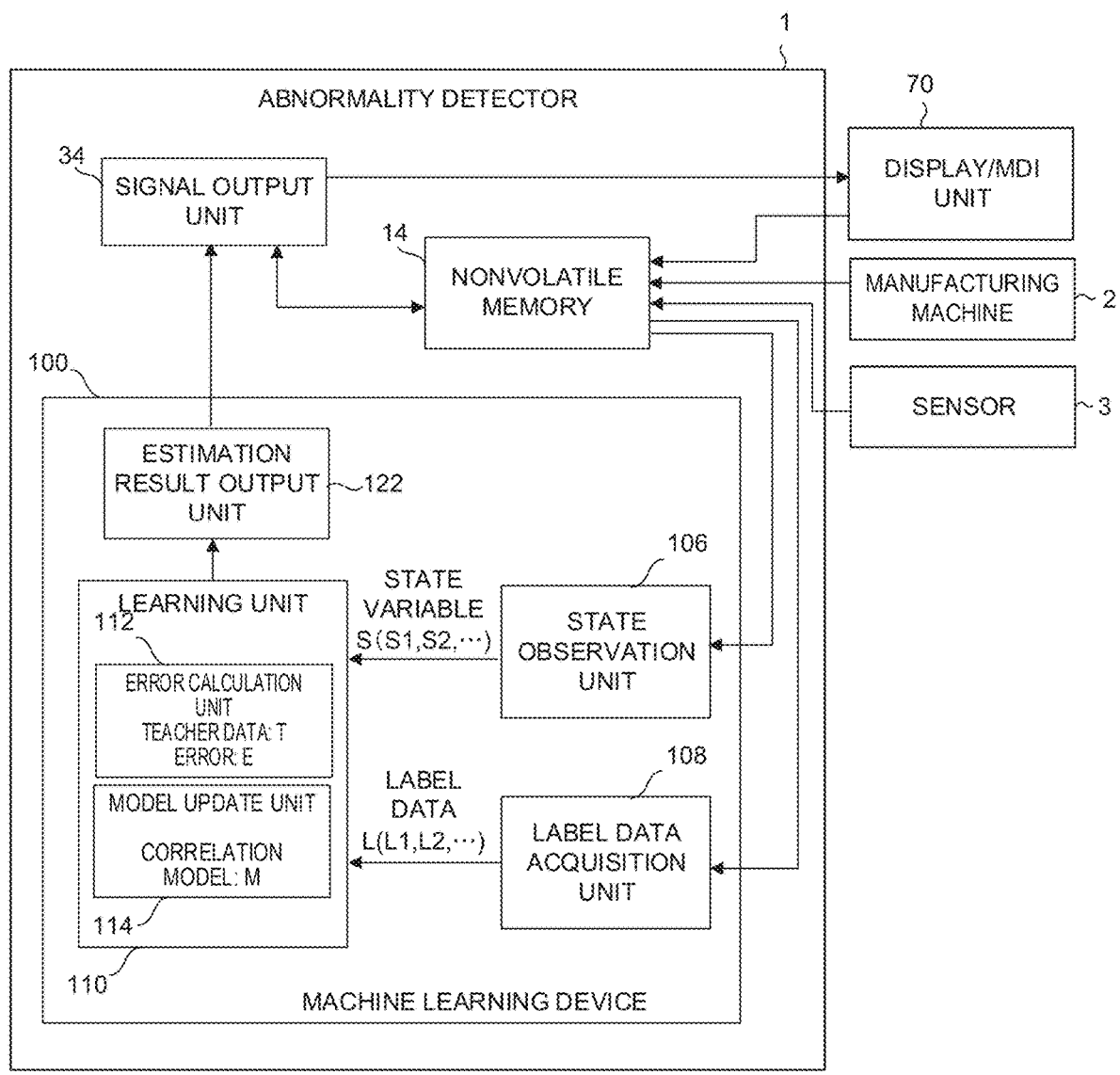
FIG. 3 is a schematic functional block diagram illustrating an embodiment of an abnormality detector.

In the machine learning device 100 having such a configuration, the learning algorithm executed by the learning unit 110 is not particularly limited, and it is possible to adopt a known learning algorithm as machine learning. FIG. 3 is another embodiment of the abnormality detector 1 illustrated in FIG. 2. The abnormality detector 1 includes a learning unit 110 for performing supervised learning as a learning algorithm. In the supervised learning, a known data set (referred to as teacher data) of an input and its corresponding output is provided. The learning unit 110 identifies, from the teacher data, a feature that implies the correlation between the input and the output. In this way, the learning unit 110 generates correlation model for estimating an output for a new input by the supervised learning.

In the machine learning device 100 included in the abnormality detector 1 illustrated in FIG. 3, the learning unit 110 includes an error calculation unit 112 and a model update unit 114. The error calculation unit 112 calculates an error E between correlation model M for estimating the operation state of the manufacturing machine 2 based on the physical quantity obtained from the manufacturing machine 2 or the sensor 3, and correlation feature identified from teacher data T. Here, the teacher data is data obtained from the physical quantity obtained from the manufacturing machine 2 or the sensor 3 in the past and a confirmation result of the operation state of the manufacturing machine 2 at that time. The model update unit 114 updates the correlation model M such that the error E between the correlation model M and the correlation feature is reduced. In the learning unit 110, the model update unit 114 repeats updating of the correlation model M, thereby bringing the correlation model M closer to an optimal model according to the environment. That is, in the learning unit 110, learning is performed to generate the correlation model M used to estimate the operation state of the manufacturing machine 2 with respect to the physical quantity acquired from the manufacturing machine 2 or the sensor 3.

The initial value of the correlation model M is, for example, expressed by simplifying (for example, by a linear function) the correlation between the state variable S and the label data L, and is provided to the learning unit 110 before the start of supervised learning. The teacher data T includes the data of the physical quantity of the manufacturing machine 2 acquired in the past as described above, or the data of the physical quantity acquired from the sensor 3, and the data of the confirmation result of the operation state of the manufacturing machine 2. The teacher data T is provided to the learning unit 110 as necessary during operation of the abnormality detector 1. The error calculation unit 112 identifies the correlation feature that implies the correlation between the physical quantity obtained from the manufacturing machine 2 or the sensor 3 and the operation state of the manufacturing machine 2, based on the teacher data T provided to the learning unit 110 as necessary. The error calculation unit 112 obtains an error E between the correlation feature, and the correlation model M corresponding to the state variable S and label data L in the present state. The model update unit 114 updates the correlation model M in a direction in which the error E becomes smaller according to, for example, a predetermined update rule.

In the next learning cycle, the error calculation unit 112 estimates the operation state of the manufacturing machine 2, using the state variable S according to the updated correlation model M. Also, the error calculation unit 112 obtains an error E between the estimation result and the label data L actually acquired. The model update unit 114 updates the correlation model M again based on the error obtained by the error calculation unit 112. In this way, correlation between the present state and an estimation result of the unknown environment becomes gradually obvious.

The learning unit 110 may perform learning by using a neural network when proceeding with the supervised learning described above. The neural network used when learning is performed in the learning unit 110 is, for example, a neural network having three layers of an input layer, an intermediate layer, and an output layer. Also, the neural network may be a neural network having more than three layers. That is, the machine learning device 100 is also capable of performing more effective learning and inference by using deep learning.

The learning unit 110 may also perform learning and inference by using a recurrent neural network. In the recurrent neural network, among data input in time series, data input in the past is also considered to perform learning and inference.

The configuration of the machine learning device 100 described above may be described as a machine learning method (or software) executed by the processor 101. This machine learning method is a machine learning method of learning estimation of the operation state of the manufacturing machine 2 from the physical quantity acquired from the manufacturing machine 2 or the sensor 3, including: a step of observing a physical quantity (physical quantity data S1) acquired from the manufacturing machine 2 or the sensor 3 as a state variable S representing a present state; a step of acquiring an operation state (operation state data L1) of the manufacturing machine 2 as label data L; a step of performing learning by associating the physical quantity acquired from the manufacturing machine 2 or the sensor 3 with the operation state of the manufacturing machine 2, using the state variable S and the label data L, by the processor 101.

Figure 4:
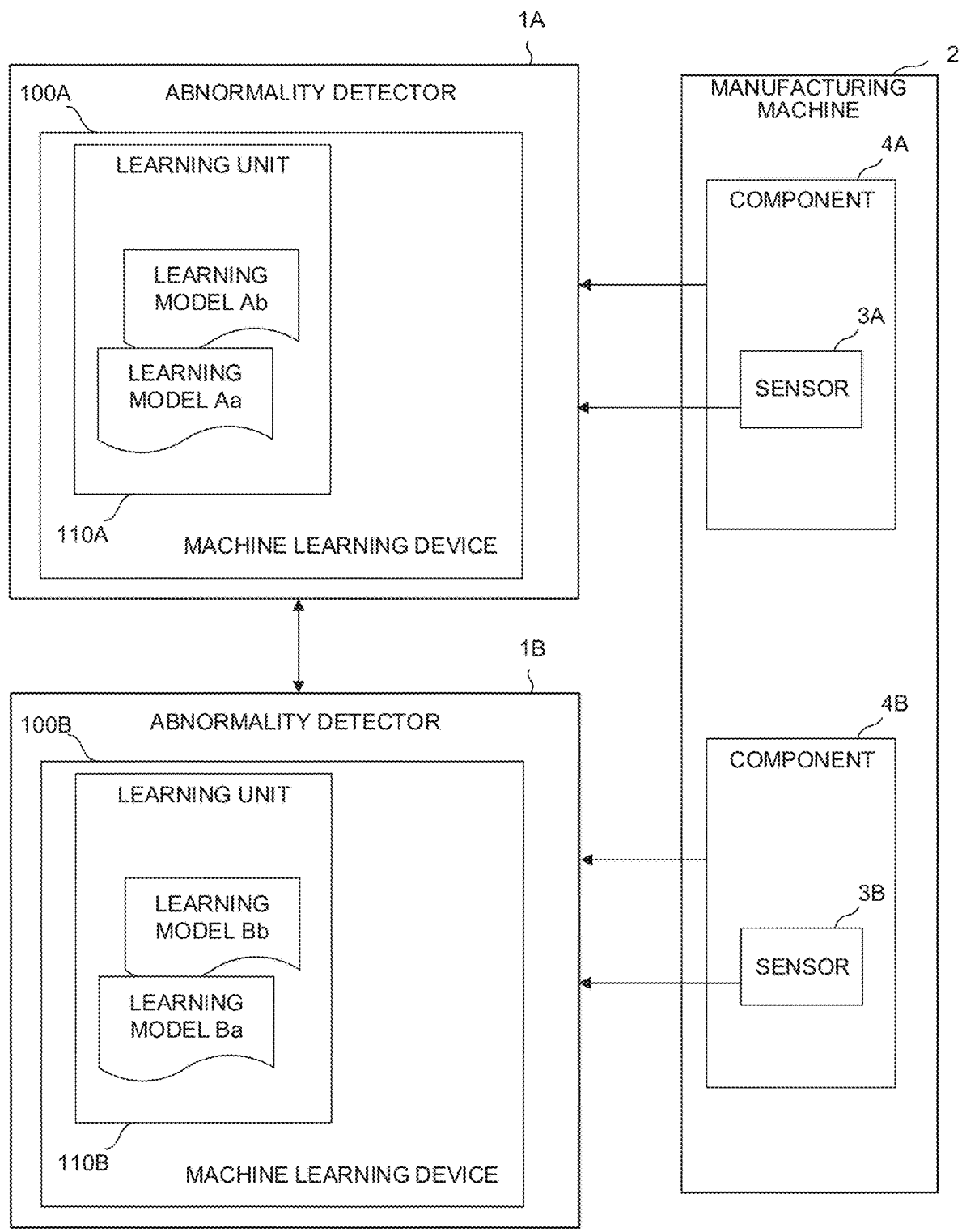
FIG. 4 is a schematic functional block diagram of an abnormality detector according to another embodiment.

FIG. 4 is a schematic functional block diagram of an abnormality detector including a machine learning device according to another embodiment. In this embodiment, there is illustrated an example of a case where an abnormality detector for detecting a sign of an abnormality of a component is provided for each component included in the manufacturing machine such as a motor or a power supply. Incidentally, although not illustrated in FIG. 4, the abnormality detector according to the present embodiment includes functional means such as a signal output unit, similarly to the embodiment described with reference to FIG. 2. The machine learning device also includes each functional means such as a state observation unit and a label acquisition unit.

An abnormality detector 1A according to the present embodiment is installed to detect a sign of an abnormality of a component 4A included in the manufacturing machine 2. The abnormality detector 1A acquires physical quantities from the component 4A and a sensor 3A installed in the vicinity of the component 4A. Also, the machine learning device 100A included in the abnormality detector 1A includes a learning model Aa for learning and estimating the operation state of the component 4A and a learning model Ab for learning and estimating the operation state of the component 4B, in the learning unit 110A.

The abnormality detector 1A is configured to be communicable with an abnormality detector 1B directly or through a computer or the like disposed on a network.

Similarly to the first embodiment, the abnormality detector 1A having such a configuration performs learning by associating physical quantities obtained from the component 4A and the sensor 3A with the operation state of the component 4A, using the learning model Aa. Also, the abnormality detector 1A performs learning by associating the physical quantities obtained from the component 4A and the sensor 3A with the operation state of the component 4B, using the learning model Ab. At this time, the abnormality detector 1A may acquire the operation state of the component 4B from the abnormality detector 1B directly or through a computer or the like disposed on the network.

On the other hand, the abnormality detector 1B according to the present embodiment is installed to detect a sign of an abnormality of the component 4B included in the manufacturing machine 2. The abnormality detector 1B acquires physical quantities from the component 4B and the sensor 3B installed in the vicinity of the component 4B. Also, the machine learning device 100B included in the abnormality detector 1B includes a learning model Bb for learning and estimating the operation state of the component 4B and a learning model Ba for learning and estimating the operation state of the component 4A, in the learning unit 110B.

The abnormality detector 1B is configured to be communicable with the abnormality detector 1A directly or through a computer or the like disposed on a network.

Similarly to the first embodiment, the abnormality detector 1B having such a configuration performs learning by associating physical quantities acquired from the component 4B and the sensor 3B with the operation state of the component 4B, using the learning model Bb. Also, the abnormality detector 1B performs learning by associating the physical quantities obtained from the component 4B and the sensor 3B with the operation state of the component 4A, using the learning model Ba. At this time, the abnormality detector 1B may acquire the operation state of the component 4A from the abnormality detector 1A directly or through a computer or the like disposed on the network.

Then, the machine learning devices 100A and 100B included in the abnormality detectors 1A and 1B estimate the operation states of component 4A and 4B when detecting a sign of an abnormality in the components 4A and 4B, respectively, similarly to the first embodiment. Also, when a sign of an abnormality is detected in the component 4A, the machine learning device 100B estimates the operation state of the component 4A based on the physical quantities acquired from the component 4B and the sensor 3B. When an abnormality is detected in the component 4B, the machine learning device 100A estimates the operation state of the component 4B based on the physical quantities acquired from the component 4A and the sensor 3A. Then, one abnormality detector 1A or 1B of the abnormality detectors 1A and 1B transmits the estimation result as an auxiliary estimation result to the other of the abnormality detectors 1A and 1B.

Then, each of the abnormality detectors 1A and 1B determines the correctness/incorrectness of the detection result of the sign of abnormality by its own signal output unit, based on the estimation result of the operation state of the component based on the physical quantity acquired from the component (and the sensor) to be detected by itself and the estimation result of the operation state of the component received from the other abnormality detector. In this determination, for example, only in a case where the operation states of the components estimated by the machine learning device included in each of the abnormality detectors all affirm the determination result of the signal output unit, the signal output unit may output a positive response for the own determination. Also, the signal output unit may perform determination by assigning a predetermined weight to the operation state of the component estimated by the machine learning device included in each abnormality detector.

FIG. 4 illustrates an example in which an abnormality detector is provided for each of the two components. However, an abnormality detector may be provided for each of the more components. In this case, the machine learning device included in each abnormality detector is provided with a learning model for learning the operation state of each component. Also, the machine learning devices included in respective abnormality detectors may mutually use the estimation results of the operation states of the respective components.

As described above, although embodiments of the present disclosure were described, the present disclosure may be implemented in various forms by adding an appropriate and suitable change, without being limited to embodiments described above.

For example, the abnormality detector 1 according to the aforementioned embodiment may be used not only for detecting a sign of an abnormality of the manufacturing machine 2, but also for analyzing a learned model on which machine learning has been performed. In this way, the abnormality detector 1 analyzes conditions (actions) of the sign of abnormality due to the installation environment of the manufacturing machine 2, such as an area where the manufacturing machine 2 is installed, a power supply circumstance of a power supply supplied to the manufacturing machine 2, a type of the manufacturing machine 2, a machine axis, a factory, the season, the number of years, and the like, and is able to easily specify a cause of the abnormality.

Also, a learned model learned in one abnormality detector 1 may be input to another abnormality detector 1 for use. Thereby, the other abnormality detector 1, which is used in an environment similar to the environment where one abnormality detector 1 is used, is capable of detecting a sign of an abnormality with high accuracy without performing machine learning.

The invention claimed is:

1. An abnormality detector for a manufacturing machine, the abnormality detector comprising:
a processor configured to:
cause to output a signal in response to a detection of a sign of an abnormality in the manufacturing machine based on a physical quantity acquired from
(1) the manufacturing machine,
(2) a sensor installed in the manufacturing machine or
(3) a sensor installed in a vicinity of the manufacturing machine,
observe, as a state variable representing a present state of an environment, physical quantity data indicating the physical quantity related to an operation of the manufacturing machine from the manufacturing machine, the sensor installed in the manufacturing machine, or the sensor installed in the vicinity of the manufacturing machine,
acquire, as label data, operation state data indicating an operation state of the manufacturing machine,
learn the operation state of the manufacturing machine with respect to the physical quantity related to the operation of the manufacturing machine, using the state variable and the label data, and
estimate the operation state of the manufacturing machine using a learned result, based on the physical quantity related to the operation of the manufacturing machine, and output an estimation result,
wherein, even when a sign of an abnormality in the manufacturing machine has been detected, the processor is configured to still suspend output of the signal, according to the output estimation result of the operation state of the manufacturing machine,
wherein the processor is further configured to
calculate an error between (i) a correlation model for estimating the operation state of the manufacturing machine based on the physical quantity obtained from the manufacturing machine, the sensor installed in the manufacturing machine, or the sensor installed in the vicinity of the manufacturing machine, and (ii) a correlation feature identified from teacher data, which is obtained from the physical quantity obtained from the manufacturing machine, the sensor installed in the manufacturing machine, or the sensor installed in the vicinity of the manufacturing machine in the past and a confirmation result of the operation state of the manufacturing machine at that time, and update the correlation model such that the error between the correlation model and the correlation feature is reduced, and repeat updating of the correlation model, thereby bringing the correlation model closer to an optimal model according to the environment.

2. The abnormality detector according to claim 1, wherein the abnormality detector is configured to detect a sign of an abnormality for each component of the manufacturing machine, the processor is configured to:
  learn an operation state of a component of the manufacturing machine with respect to a physical quantity acquired from the component to be detected for the sign of the abnormality, a sensor installed in the component or a sensor installed in a vicinity of the component,
  learn an operation state of a further component of the manufacturing machine with respect to a physical quantity acquired from the further component to be detected for the sign of the abnormality, the sensor installed in the component or the sensor installed in the vicinity of the component, and
  estimate the operation states of the component and the further component, using a learning result, based on the physical quantity related to the observed operation of the manufacturing machine, and output the estimation result; and wherein, even when a sign of an abnormality in the manufacturing machine has been detected, the processor is configured to still suspend output of the signal, according to the output estimation result of the operation state of the manufacturing machine, and an estimation result of the operation state of the manufacturing machine output by another abnormality detector.

3. The abnormality detector according to claim 1, wherein from the physical quantity related to the operation of the manufacturing machine, the processor is configured to use a characteristic portion of the physical quantity extracted based on at least one of a fluctuation amount of the physical quantity, an amplitude, a fluctuation time, the number of fluctuations, a frequency, and an amount of deviation from a specified value for outputting a signal indicating an abnormality, for learning.

4. The abnormality detector according to claim 1, wherein the processor is configured to classify a waveform detected by the manufacturing machine or detected around the manufacturing machine into any one of
  a waveform of a physical quantity indicating the abnormality,
  a waveform of a physical quantity indicating stability, and
  a waveform of a physical quantity unrelated to the abnormality.

5. The abnormality detector according to claim 2, wherein, in a case where the operation states of the components estimated by each of the abnormality detectors all affirm the abnormality in the manufacturing machine, the processor is configured to cause to output the signal.

* * * * *